US011906144B1

(12) United States Patent
Loomis

(10) Patent No.: US 11,906,144 B1
(45) Date of Patent: Feb. 20, 2024

(54) LIGHT SOCKET FOR FLAT RIBBON CABLE WITH SELECTABLE WIRE CONNECTION

(71) Applicant: Seasons 4, Inc., Toano, VA (US)

(72) Inventor: Jason Loomis, Decatur, GA (US)

(73) Assignee: Seasons 4, Inc., Toano, VA (US)

(*) Notice: Subject to any disclaimer, the term of this patent is extended or adjusted under 35 U.S.C. 154(b) by 0 days.

(21) Appl. No.: 17/817,627

(22) Filed: Aug. 4, 2022

(51) Int. Cl.
*F21V 23/06* (2006.01)
*F21V 23/04* (2006.01)
*F21V 21/002* (2006.01)
*F21Y 115/10* (2016.01)

(52) U.S. Cl.
CPC ............ *F21V 23/06* (2013.01); *F21V 21/002* (2013.01); *F21V 23/04* (2013.01); *F21Y 2115/10* (2016.08)

(58) Field of Classification Search
CPC ........ H01R 12/67; H01R 4/24; H01R 4/2404; H01R 4/2406; H01H 63/12; H01H 19/08; F21V 23/06; F21V 23/04; F21V 21/002
See application file for complete search history.

(56) References Cited

U.S. PATENT DOCUMENTS 2,897,474 A * 7/1959 Willans .............. H01R 33/7635 439/554
4,631,650 A * 12/1986 Ahroni .................. F21V 21/002 174/114 R
5,051,877 A * 9/1991 Liao ...................... F21V 21/002 362/249.16
5,330,368 A * 7/1994 Tsuruzono ............. H01R 33/09 439/409
5,420,482 A * 5/1995 Phares ................. H05B 47/155 315/300
5,672,000 A * 9/1997 Lin ...................... H01R 4/2404 362/241
5,997,338 A * 12/1999 Pohjola ................ H01R 12/675 439/425
6,171,135 B1 * 1/2001 Yang .................. H01R 33/9555 439/456
6,225,580 B1 * 5/2001 Lemire .................. H01H 19/04 200/11 DA
6,328,593 B1 * 12/2001 Chang .................. H01R 33/965 439/419
6,777,891 B2 * 8/2004 Lys ...................... H05B 47/155 315/291
10,799,054 B2 * 10/2020 Long ...................... H05B 45/20
2006/0197474 A1 * 9/2006 Olsen ..................... H05B 47/18 315/312

* cited by examiner

*Primary Examiner* — Ismael Negron
(74) *Attorney, Agent, or Firm* — Kinney & Lange, P.A.

(57) ABSTRACT

A cable interface is configured to mechanically and electrically connect to, via a plurality of piercing members, power-channel wires and a common wire of a ribbon cable. A lighting-element socket coupled to the cable interface is configured to receive a lighting element within and to provide electrical connection between power and common electrical contacts of the lighting element received and power-channel and common electrical contacts of the lighting-element socket. A channel selector conductively connected to the power electrical contact of the lighting-element socket is configured to select and electrically connect to a selected one of the plurality of power-channel wires via the power-channel contacting members.

17 Claims, 6 Drawing Sheets

LIGHT SOCKET FOR FLAT RIBBON CABLE WITH SELECTABLE WIRE CONNECTION

BACKGROUND

Decorative lighting displays are used to communicate a joy of a holiday season, to draw attention to merchandise, or to simply decorate or adorn an object. Decorative lighting displays can be used both indoors and outdoors. Decorative lighting displays have been used residentially to adorn trees, shrubs, and houses. Commercial businesses can use decorative lighting displays to provide festive atmospheres at their places of business.

Some such decorations can involve many decorative lighting displays. Such lighting displays can provide a constant illumination display, while others provide a time sequence of spatial illumination patterns. Such constant or time-sequence patterns of illumination are produced by a constant or time-sequence of an electrical signal provided to the decorative lighting display. Some decorative lighting displays have lighting elements that can change color and/or intensity in a response to command data provided thereto. Other decorative lighting displays have only fixed color lighting elements that do receive such command data. Such fixed-color lighting elements can still have temporal variation of illumination in response to temporal variation of an electrical signal. Such fixed-color lighting elements can be combined with other and sometimes differently colored fixed color lighting elements in a decorative lighting display. But such lighting elements are typically not customizable beyond their response to various electrical signals.

SUMMARY

Some embodiments relate to a lighting-element/ribbon-cable connector with selectable wire connection. the lighting-element/ribbon-cable connector includes a cable interface, a plurality of wire contacting members, a lighting-element socket, and a channel selector. The cable interface is configured to mechanically and electrically connect the lighting-element/ribbon-cable connector to a flat ribbon cable having a plurality of power-channel wires and a common wire. The plurality of wire contacting members includes a plurality of power-channel contacting members and a common contacting member. The plurality of power-channel contacting members are aligned and configured to pierce insulation of corresponding ones of the plurality of power-channel wires, and the common contacting member is aligned and configured to pierce insulation of the common wire when the cable interface mechanically connects the lighting-element/ribbon-cable connector to the flat ribbon cable. The lighting-element socket is coupled to the cable interface. The lighting-element socket is configured to receive a lighting element and to provide electrical connection between power and common electrical contacts of the lighting element received and the power and common contacts of the lighting-element socket, respectively. The channel selector is conductively connected to the power contact of the lighting-element socket and configured to select and electrically connect to a selected one of the plurality of power-channel contacting members.

Some embodiments relate to a method for providing power-channel selection and electrical connection of a lighting element to a selected one of a plurality of insulated wires of a flat ribbon cable, the method includes connecting, via a cable interface, a lighting-element socket to the flat ribbon cable. The method includes piercing, via a plurality of piercing members, insulation of corresponding ones of the plurality of insulated wires when the cable interface connects the lighting-element socket to the flat ribbon cable. The plurality of piercing members includes a plurality of peripheral ones located at a common radial distance about a central one. The method includes providing, via each of the plurality of piercing members, a conductive connection point to the corresponding one of the plurality of insulated wires. The method includes receiving, via a lighting-element socket coupled to the cable interface, a lighting element within. The method includes conductively connecting, via the lighting-element socket, a central electrical contact at a base of the lighting element received and the central one of the plurality of piercing members. The method includes conductively connecting, via the lighting-element socket, a peripheral electrical contact about the base of the lighting element received and an inner conductive peripheral wall of the lighting-element socket. The method also includes rotatably selecting and conductively connecting, via a rotatable power-channel selector conductively connected to the inner conductive peripheral wall of the lighting-element socket, to a selected one of the peripheral ones of the plurality of piecing members.

DETAILED DESCRIPTION

Apparatus and associated methods relate to a lighting-element/ribbon-cable connector that provides power-channel selection to a lighting element received therein. A cable interface is configured to mechanically engage and electrically connect to, via a plurality of piercing members, power-channel wires and a common wire of a ribbon cable. A lighting-element socket coupled to the cable interface is configured to receive a lighting element within and to provide electrical connection between power and common electrical contacts of the lighting element received and power-channel and common electrical contacts of the lighting-element socket. A channel selector conductively connected to the power electrical contact of the lighting-element socket is configured to select and electrically connect to a selected one of the plurality of power-channel wires via the power-channel contacting members.

Figure 1:
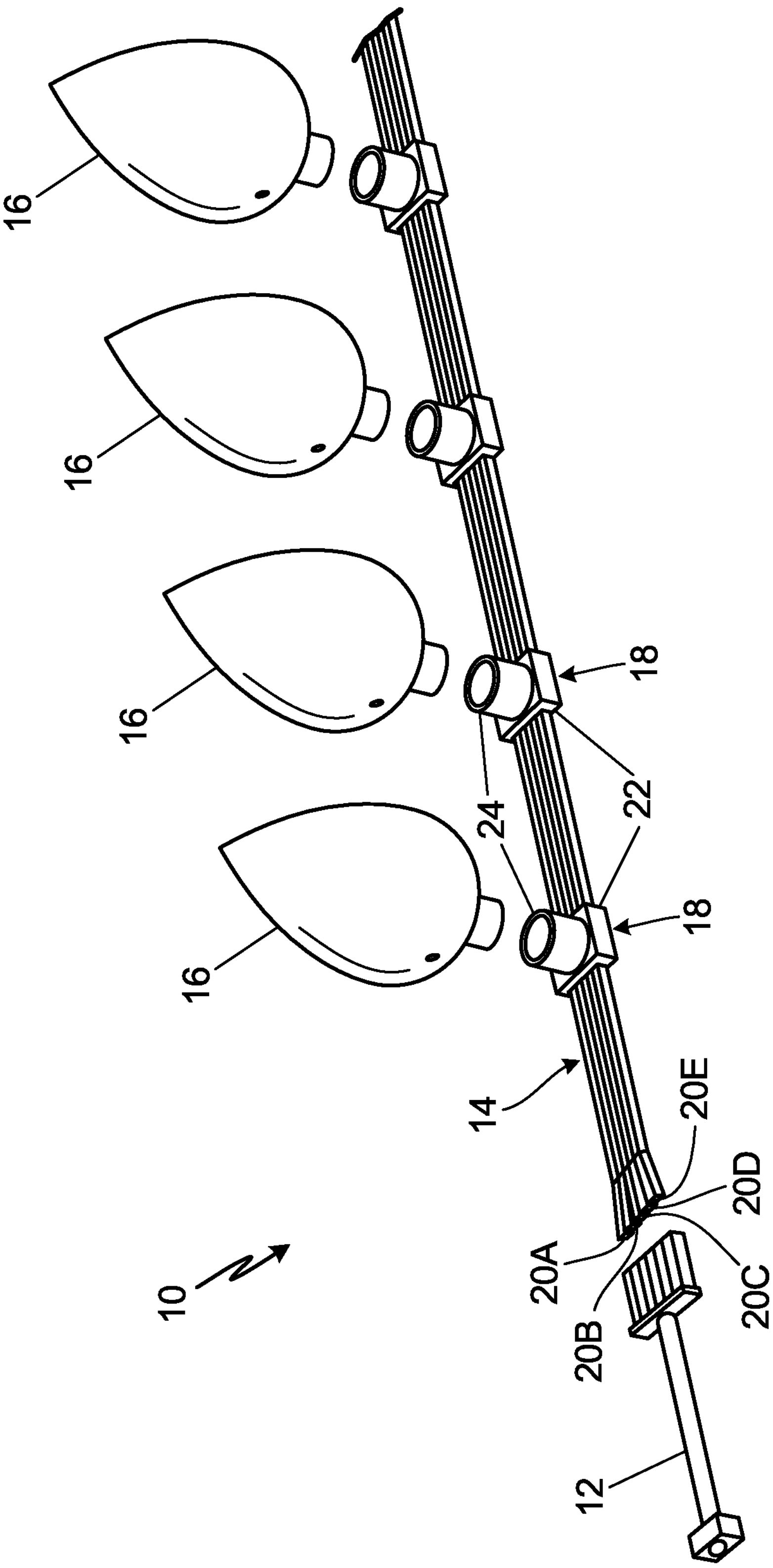
FIG. 1 is perspective view of a lighting display system that has lighting-element/ribbon-cable connectors with selectable wire connection capability.

FIG. 1 is perspective view of a lighting display system that has lighting-element/ribbon-cable connectors with selectable wire connection capability. In FIG. 1, lighting display system 10 includes system connector 12 coupled to flat ribbon cable 14, which has lighting elements 16 connected thereto via lighting-element/ribbon-cable connectors 18, respectively. System cable connector 12 is configured to connect lighting display system 10 to a source of power and/or to lighting control signals using a connector and signal protocols consistent with such a source(s). In the depicted embodiment, the source is one that can provide four channels of lighting signals. Such power and lighting control signals are provided to lighting elements 16 via flat ribbon cable 14, which has five insulated wires 20A-20E, insulated wires 20A-20B and 20D-20E are power-channel wires, and insulated wire 20C is a power return wire (or common wire). Each of power-channel wires 20A-20B and 20D-20E provides operating power for any and all lighting elements connected thereto.

Each of lighting-element/ribbon-cable connectors 18 has cable interface 22 and cylindrical lighting-element socket 24. Cylindrical lighting-element sockets 24 mechanically and electrically connect cable connectors 18 to lighting elements 16. Cable interfaces 22 mechanically and electrically connect lighting-element/ribbon-cable connectors 18 to ribbon cable 14. The combination of cylindrical lighting-element socket 24 and cable interface 22, thereby mechanically and electrically couple lighting elements to ribbon cable 14. Although cable 14 includes five insulated wires 20A-20E, lighting elements 14 can be illuminated by connecting lighting elements 14 to only two of channel wires 20A-20E, provided that a voltage difference is being supplied therebetween. Each of lighting elements 14 is connected to power return wire 20C as well as a selected one of power-channel wires 20A-20B and 20D-20E. Each of cable interfaces 22 includes a channel selector (not depicted in FIG. 1) that selects and electrically connects to the selected one of power-channel wires 20A-20B and 20D-20E. Such channel selectors can facilitate custom configuration of a light string as will be described below.

Each of lighting-element/ribbon-cable connectors 18 also includes a channel selector that independently selects (i.e., independently of the channel selectors of the other cable interfaces 22 of lighting display system 10) and electrically connects to one of power-channel wires 20A-20B and 20D-E. Such selection puts the lighting element coupled element thereto (i.e., via the corresponding cylindrical lighting-element socket 24) in electrical connection with the selected power-channel wire 20A, 20B, 20D, or 20E. For example, lighting display system 10 can be configured so that all lighting elements 16 of lighting display system 10 receive operating power from channel wire 20A. In another example, lighting display system 10 can be configured so that all lighting elements 16 of lighting display system 10 receive operating power from power-channel wires 20A and 20B in an alternating fashion. In still another example, lighting display system 10 can be configured so that all lighting elements 16 of lighting display system 10 receive operating power from power-channel wires 20A-20B and 20D-E in a A-B-C-D fashion. Such configurability permits lighting display system 10 to have lights powered by power-channel wires 20A-20B and 20D-E in a variety of configurations.

Each of power-channel wires 20A-20B and 20D-E can provide power that causes lighting elements 16 to be illuminated in a different manner (i.e., a different manner than the power provided by the other power-channel wires 20A-20B and 20D-20E). For example, power-channel wires 20A-20B and 20D-E can provide operating power that has a different temporal behavior or pattern that the temporal behavior or pattern of the others. For example, one of power-channel wires 20A-20B and 20D-E can provide DC operating power with no AC component, while the other of power-channel wires 20A-20B and 20D-E can provide operating power that has AC components (e.g., a regular pulsed signal, a wave signal, A random pulsed signal, etc.). In other embodiments, each of power-channel wires 20A, 20B, 20D, and 20E are provided the same DC power level, but different data can be superimposed thereon. Such embodiments can be referred to as data over power. Thus, by selecting a specific power-channel wire, 20A, 20B, 20D, or 20E, the channel selector of a specific lighting-element/ribbon-cable connectors 18 causes its corresponding lighting element 16 to be illuminated in response to the specific manner of power that is provided thereby.

Figure 2:
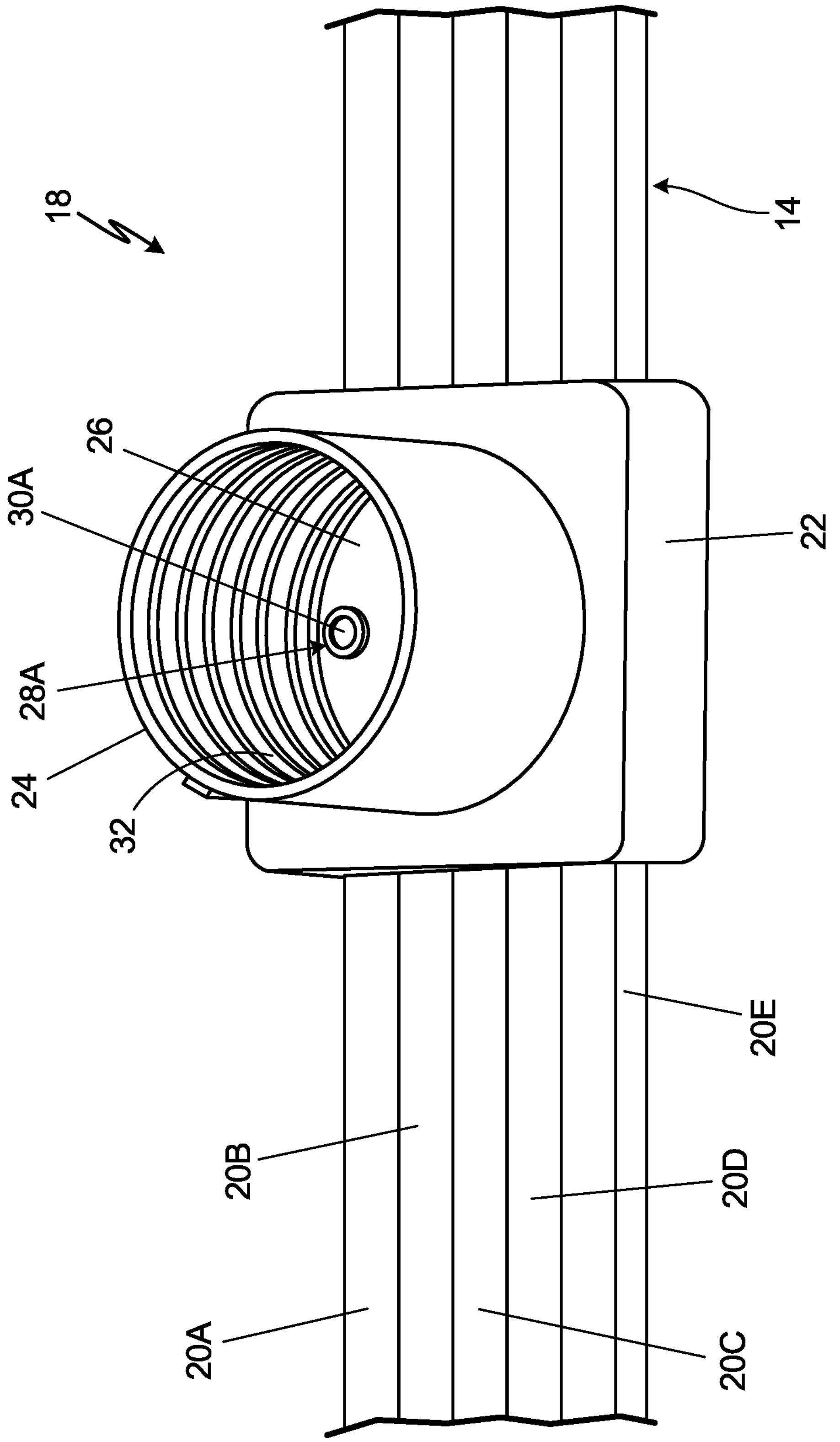
FIG. 2 is a close-up view of a lighting-element/ribbon-cable connector with selectable wire connection capability.

FIG. 2 is a close-up view of a lighting-element/ribbon-cable connector with selectable wire connection capability. In FIG. 2, lighting-element/ribbon-cable connectors 18 includes cable interface 22, cylindrical lighting-element socket 24, and contact plate 26. Contact plate 26 has wire contacting members 28A-28E, of which only one can be seen in FIG. 2. Each of wire contacting members 28A-28E is conductively contacting a conductor of a corresponding one of insulated wires 20A-20E. Each of wire contacting members 28A-28E has a piercing member that pierces insulation surrounding the conductor of its corresponding one of insulated wires 20A-20E. The piercing member is not depicted in FIG. 2, as it extends from a bottom (i.e., ribbon-cable engaging) surface of the contact plate 26, and projects into the conductor to which it is aligned. Each of wire contacting members 28A-28E presents a contact face 30A-30E on a top surface (e.g., within cylindrical lighting-element socket 24). Contact faces 30A-30E are configured to be selectively and electrically connected to a contacting interface of cylindrical lighting-element socket 24. In the depicted embodiment, contact faces 30A-30E are configured to be selectively and electrically connected to conductive inner conductive peripheral wall 32 of cylindrical lighting-element socket 24. Conductive inner conductive peripheral wall 32 is configured to mechanically and electrically coupled to an outer surface of an electrical connector of lighting element 16 (as depicted in FIG. 1), when coupled element thereto.

Figure 3B:
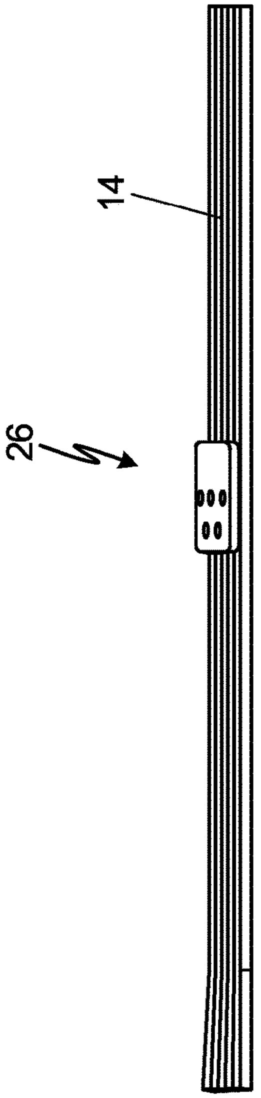
FIGS. 3A-3B are various views of a contact plate of a lighting-element/ribbon-cable connector showing a configuration of piercing members.
Figure 3A:
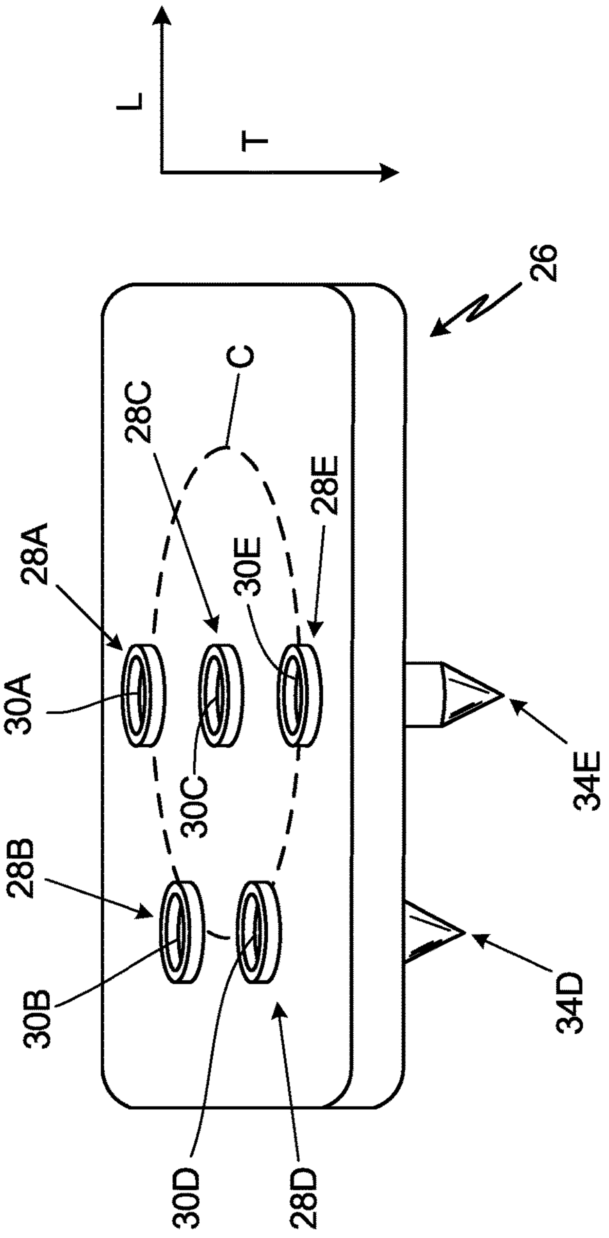

FIGS. 3A-3B are various views of a contact plate of a lighting-element/ribbon-cable connector showing a configuration of piercing members. In FIG. 3A, contact plate 26 includes wire contacting members 28A-28E projecting therethrough. Wire contacting members 28A-28E have piercing members 34A-34E, which are configured to pierce insulation surrounding conductors of insulated wires 20A-20E. Wire contacting members 28A-28E are equally spaced apart in a first direction T transverse to a second direction L, along which ribbon cable 14 extends when engaged with contact plate 26. Such spacing corresponds to an equal spacing of insulated wires 20A-20E of ribbon cable 14 in such a transverse direction T. When engaged with ribbon cable 14, piercing members 34A-34E project into conductors of corresponding insulated wires 20A-20E, thereby conductively coupling wire contacting members 28A-28E with conductors of corresponding insulated wires 20A-20E. In some embodiments piercing members 34A-34E are pointed tips as depicting in FIGS. 3A-3B. In other embodiments, piercing members 34A-34E could be sharp blades aligned so as to pierce the insulation along each of the conductors of corresponding insulated wires 20A-20E.

Wire contacting members 28A-28E includes power-channel contacting members 28A-28B and 28D-28E and common contacting member 28C (which can also be called power-return contacting member 28C). Power-channel contacting members 28A-28B and 28D-28E are arranged along circle C. Common contacting member 28C is located at a center of circle C, which is also a center of cylindrical lighting-element sockets 24, as will be shown below. Such arrangement of wire contacting members 28A-28E with relation to circle C facilitates selection and electrical connection of power-channel contacting members 28A-28B and 28D-28E by a rotatable channel selector, as will be shown below. Such electrical connection can be made to contact faces 30A-30B and 30D-30E. Such a rotatable channel selector can select and electrically connect one of contact faces 30A-30B and 30D-30E to a first terminal (e.g., an outer surface of the electrical connector of lighting element 16) of lighting element 16, when coupled element to cylindrical lighting-element socket 24. A second terminal of lighting element 16, which is located at a bottom center of the electrical connector of lighting element 16, can electrically connect to contact face 30C of contacting member 28C, thereby providing a return power connection to power return wire 20C of ribbon cable 14. As shown in the embodiment depicted in FIG. 3A, contact faces 30A-30E have a recessed portion or detent portion in which a contacting pin of the rotatable channel selector or the second terminal of lighting element 16 can be received. Such detent/pin design is configured to provide tactile indication of connection with the rotatable channel selector.

FIGS. 4A-4B and 4D-4E are plan views of lighting-element/ribbon-cable connectors 18 showing various channel selections. In FIGS. 4A-4B and 4D-4E, lighting-element/ribbon-cable connectors 18 include cable interface 22, cylindrical lighting-element socket 24, rotatable channel selector 36, and wire contacting members 28A-28E, of which only contact faces 30A-30E are visible, due to the plan view perspective of these figures. In the depicted configuration, wire contacting members 28A-28E are located within cylindrical lighting-element socket 24, and rotatable channel selector 36 extends in an inward direction from cylindrical lighting-element socket 24, so as to conductively couple one of power-channel contacting members 28A-28B and 28D-28E to an inner conductive peripheral wall 32 of cylindrical lighting-element socket 24. In other embodiments, power-channel contacting members 28A-28B and 28D-28E can be located outside cylindrical lighting-element socket 24, and rotatable channel selector 36 extends in an outward direction from cylindrical lighting-element socket 24, so as to conductively couple one of power-channel contacting members 28A-28B and 28D-28E to an inner conductive peripheral wall 32 of cylindrical lighting-element socket 24.

Figure 4E:
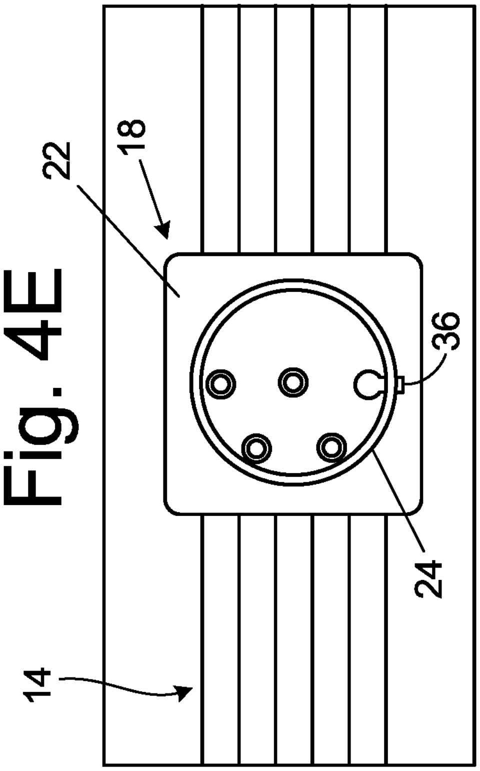
FIGS. 4A-4B and 4D-4E are plan views of lighting-element/ribbon-cable connectors showing various channel selections.
Figure 4D:
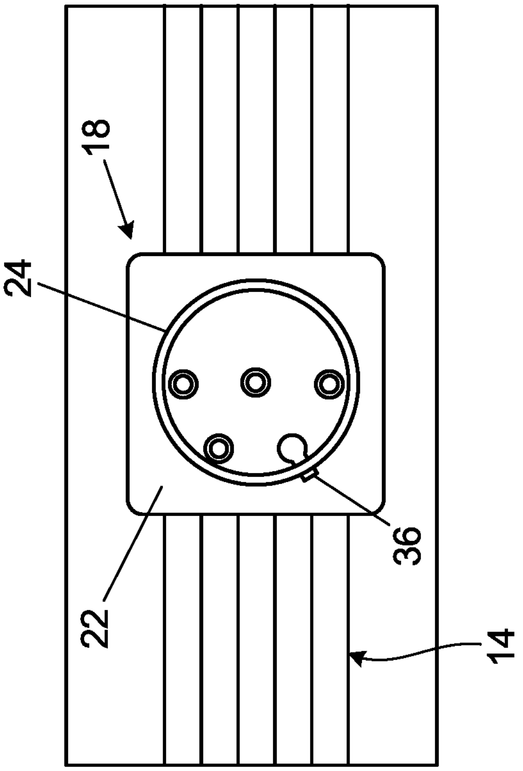
Figure 4B:
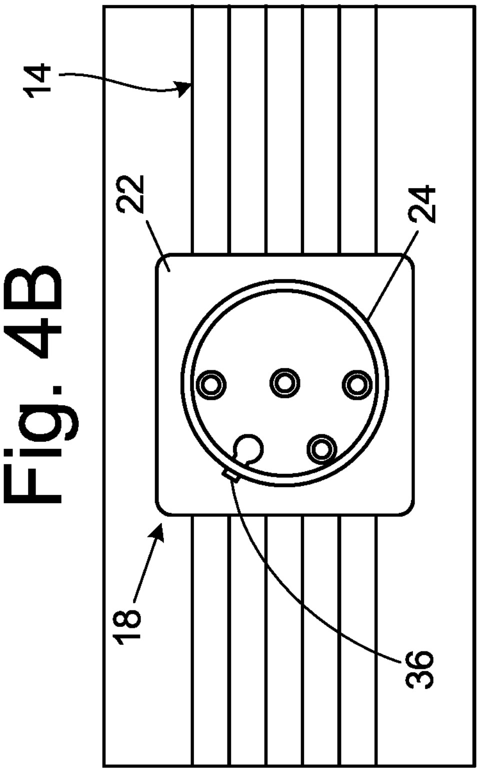
Figure 4A:
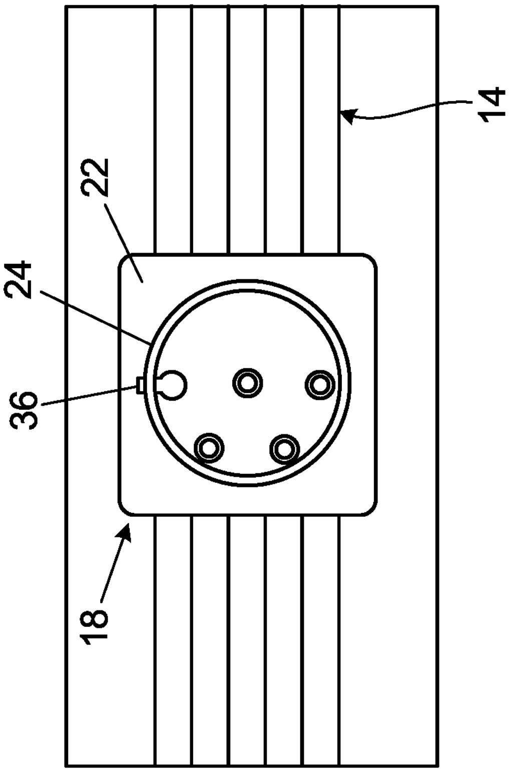

In FIG. 4A, rotatable channel selector 36 is rotated so as to select and electrically connect inner conductive peripheral wall 32 of cylindrical lighting-element socket 24 with contact face 30A of contacting member 28A. In FIG. 4B, rotatable channel selector 36 is rotated so as to select and electrically connect inner conductive peripheral wall 32 of cylindrical lighting-element socket 24 with contact face 30B of contacting member 28B. In FIG. 4D, rotatable channel selector 36 is rotated so as to select and electrically connect inner conductive peripheral wall 32 of cylindrical lighting-element socket 24 with contact face 30D of contacting member 28D. In FIG. 4E, rotatable channel selector 36 is rotated so as to select and electrically connect inner conductive peripheral wall 32 of cylindrical lighting-element socket 24 with contact face 30E of contacting member 28E. In some embodiments, rotatable channel selector 36 can be rotatable coupled element to cylindrical lighting-element socket 24. In other embodiments, rotatable channel selector 36 can be fixedly coupled element to cylindrical lighting-element socket 24, and cylindrical lighting-element socket 24 can a rotatable member of lighting-element/ribbon-cable connectors 18 (e.g., rotatable coupled element to cable interface 22).

Figures 5A, 5B, 5D, 5E:
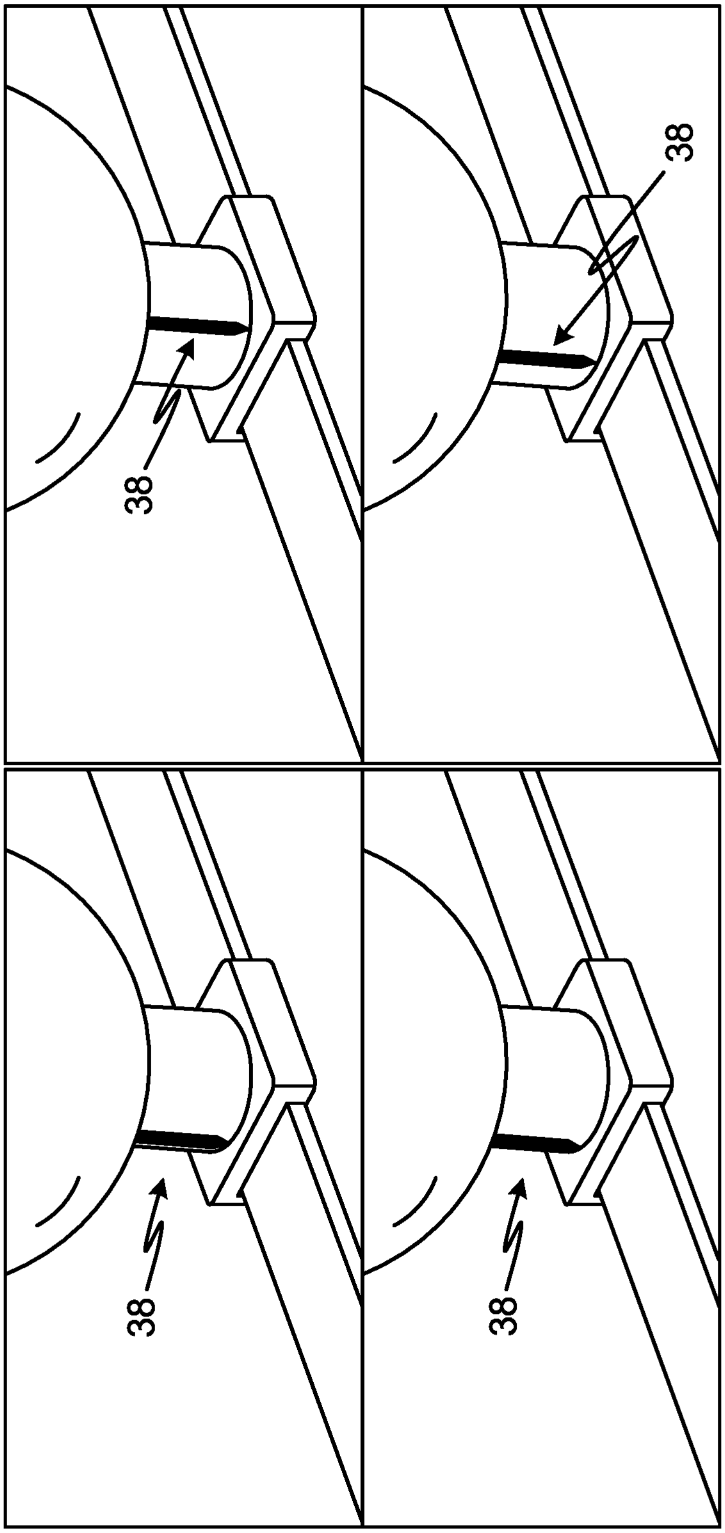
FIGS. 5A-5B and 5D-5E are perspective views of lighting-element/ribbon-cable connectors showing indicia indicating channel selection.

FIGS. 5A-5B and 5D-5E are perspective views of the lighting-element/ribbon-cable connectors 18 showing indicia indicating channel selection. In FIGS. 5A-5B and 5D-5E, lighting-element/ribbon-cable connectors 18 have cylindrical lighting-element sockets 24 with indicia 38 indicating channel selection via rotational orientation of such indicia. In the depicted embodiment, such channel selection is indicated by a rotational position of indicia 38. In FIG. 5A, indicia 38 indicates that rotatable channel selector 36 is rotated so as to select and electrically connect inner conductive peripheral wall 32 of cylindrical lighting-element socket 24 with contact face 30A of contacting member 28A. In FIG. 5B, indicia 38 indicates that rotatable channel selector 36 is rotated so as to select and electrically connect inner conductive peripheral wall 32 of cylindrical lighting-element socket 24 with contact face 30B of contacting member 28B. In FIG. 5D, indicia 38 indicates that rotatable channel selector 36 is rotated so as to select and electrically connect inner conductive peripheral wall 32 of cylindrical lighting-element socket 24 with contact face 30D of contacting member 28D. In FIG. 5E, indicia 38 indicates that rotatable channel selector 36 is rotated so as to select and electrically connect inner conductive peripheral wall 32 of cylindrical lighting-element socket 24 with contact face 30E of contacting member 28E.

Figure 6:
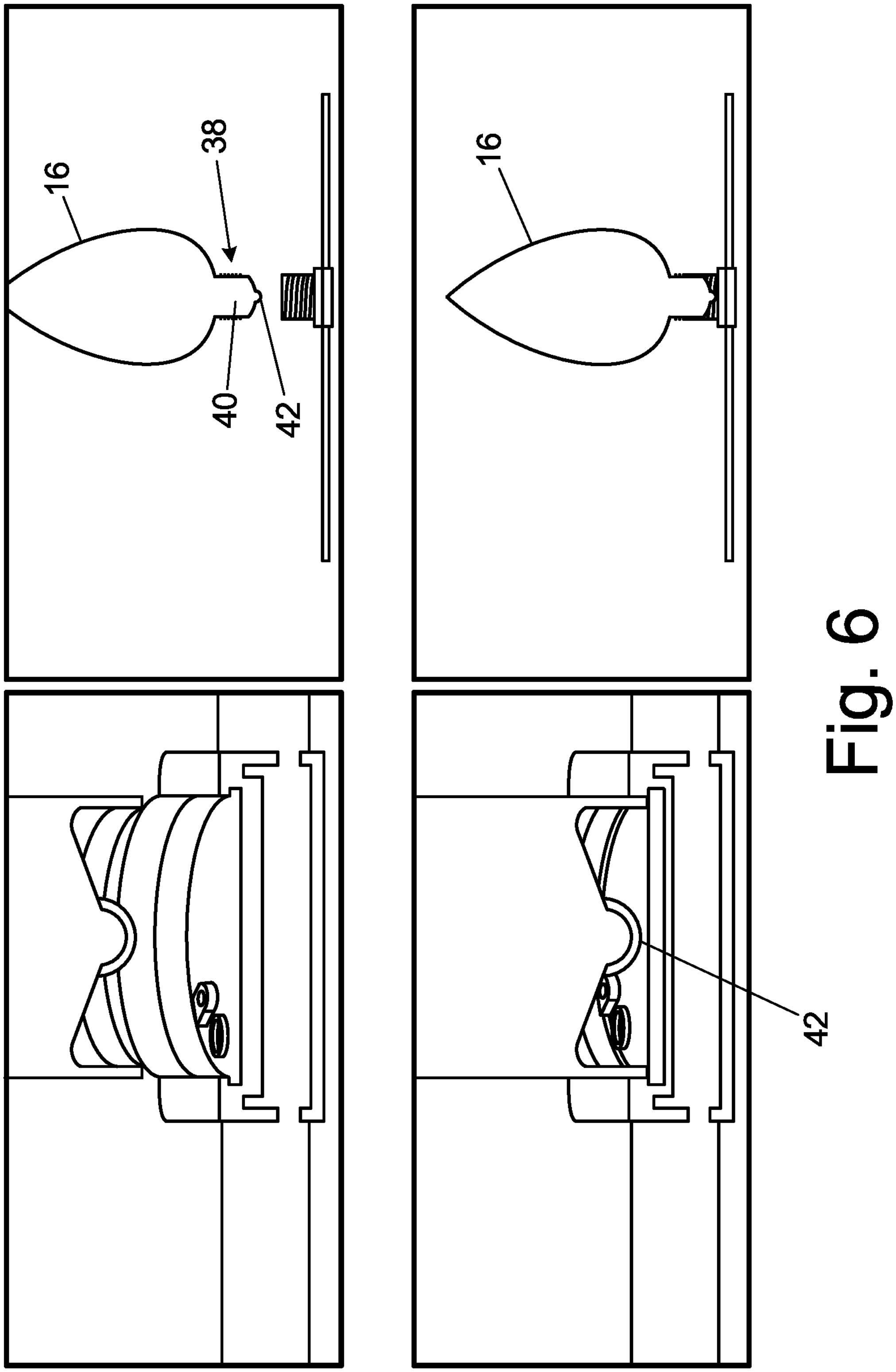
FIG. 6 are cross-sectional views of a lighting-element/ribbon-cable connector depicting a power return connection to an lighting element.

FIG. 6 are cross-sectional views of a lighting-element/ribbon-cable connector depicting a power return connection to an lighting element. In FIG. 6, lighting element 16 includes electrical connector 40. Electrical connector 40 can have threads that are configured to be received within a threaded inner surface of cylindrical lighting-element sockets 24. Such a threaded connector can facilitate mechanical connection to cylindrical lighting-element sockets 24. Electrical connector 40 has first and second terminals 42 and 44. First terminal 42 of electrical connector 40 is a substantially cylindrical conductive outer surface of electrical connector 40. Second terminal 44 is a bottom central conduction of electrical connector 40. When electrical connector 40 is fully engaged with (e.g., screwed into) cylindrical lighting-element socket 24, first terminal 40 is conductively coupled element to conductive inner surface 32 of cylindrical lighting-element socket 24, which in turn is conductively coupled element to a selected one (i.e., selected via rotatable channel selector 36) of power-channel contacting members 28A-28B and 28D-28E. Power-channel contacting members 28A-28B and 28D-28E are in turn conductively coupled element to the conductors of power-channel wires 20A-20B and 20D-20E, respectively, of ribbon cable 14. Electrical connectors such as electrical connector 40 are found on commercially available lighting elements. For example, standard LV C-bulb or a KoS C-bulb use such electrical contacts. In some embodiment lighting elements 14 can be Light Emitting Diodes (LED) with or without decorative glass enclosures. In other embodiments, other types of light illumination devices can be used, such as incandescent lamps, neon bulbs, etc.

Although lighting-element sockets, such as cylindrical lighting-element sockets 24 have been depicted to be cylindrical, and lighting elements 14 have been depicted as having a cylindrical base, other types of lighting-element sockets can be configured to receive lighting elements having various types of bases and connectors. In some embodiments, the channel selector is a rotatable channel selector, as depicted in the figures. In other embodiments, other configurations of channel section can be used, such as, for example, a linear slidable channel selector.

In some embodiments, the cable interface has a top member and a bottom member forming a clamshell structure that provides a passageway for the flat cable to pass therethrough. In some embodiments, the top member and bottom member of the cable interface have an open position and a closed position. The open position permits alignment of the lighting element/ribbon-cable connector with the ribbon cable. The closed position provides conductive connection between the lighting-element socket and the plurality of wires of the ribbon cable. Such conductive connection results from the piercing members extending into the passageway, so that when the clamshell structure is closed about the ribbon cable, the piercing members will pierce the insulation of corresponding ones of the plurality of insulated wires. In some embodiments, the top member is hingeably connected to the bottom member. In other embodiments, the top member is removably connected to the bottom member. In some embodiments, the passageway for the flat ribbon cable to pass therethrough is sized substantially equal to a size of the flat ribbon cable.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A lighting-element socket connector for connecting a lighting element to a flat ribbon cable having a plurality of wires, the lighting-element socket connector comprising:

a cable interface configured to mechanically and electrically connect the socket connector to the flat ribbon cable;

a plurality of wire contacting members that includes a common contacting member and a plurality of power-channel contacting members located along a circle about the common contacting member at a common radial distance therefrom, each of the plurality of wire contacting members configured to pierce insulation of corresponding ones of the plurality of wires of the flat ribbon cable when the cable interface mechanically connects the lighting-element socket connector to the flat ribbon cable;

a lighting-element socket configured to receive a lighting element and to provide electrical connection between electrodes of the lighting element and contacts of the lighting-element socket, and a channel selector configured to rotatably select and electrically connect a selected one of the plurality of power-channel contacting members to one of the contacts of the lighting element socket.

2. The lighting-element socket connector of claim 1, further comprising:

indicia on an external surface of the lighting-element socket and/or the cable interface, thereby providing visual indication of which of the plurality of power-channel piercing members is conductively coupled to the power contact of the lighting-element socket.

3. The lighting-element socket connector of claim 1, wherein the lighting-element socket is configured to receive a cylindrical Light Emitting Diode (LED).

4. The lighting-element socket connector of claim 1, wherein the cable interface has a top member and a bottom member forming a clamshell structure that provides a passageway for the flat cable to pass therethrough.

5. The lighting-element socket connector of claim 4, wherein the top member and bottom member of the cable interface have an open position and a closed position.

6. The lighting-element socket connector of claim 4, wherein the top member is removably connected to the bottom member.

7. The lighting-element socket connector of claim 4, wherein the passageway for the flat ribbon cable to pass therethrough is sized substantially equal to a size of the flat ribbon cable.

8. The lighting-element socket connector of claim 4, wherein each of the piercing members extends into the passageway, so that when the clamshell structure is closed about the ribbon cable, the piercing members will pierce the insulation of corresponding ones of the plurality of power-channel wires and the common wire.

9. The lighting-element socket connector of claim 1, wherein the lighting-element socket is a cylindrical lighting-element socket.

10. The lighting-element socket connector of claim 9, wherein the cylindrical lighting-element socket is located symmetrically about a common wire contacting member.

11. The lighting-element socket connector of claim 10, wherein the lighting element socket is further configured to receive a lighting element having a threaded base with the common electrical contact located at a bottom center of the threaded base, the common contacting member configured to conductively contact the common electrical contact of the lighting element when the lighting element is received in the lighting-element socket.

12. The lighting-element socket connector of claim 1, wherein a power contact of the lighting-element socket comprises an inner conductive surface of the lighting-element socket, which is threaded so as to receive a threaded base of the lighting element.

13. The lighting-element socket connector of claim 12, wherein the threaded lighting-element socket is configured to receive a standard LV C-bulb or a KoS C-bulb.

14. The lighting-element socket connector of claim 12, wherein the channel selector is a rotatable channel selector that is conductively connected to the inner conductive wall of the lighting-element socket.

15. The lighting-element socket connector of claim 14, wherein each of the plurality of wire contacting members has a detent, thereby providing tactile indication of connection with the rotatable channel selector.

16. A method for providing power-channel selection and electrical connection of a lighting element to a selected one of a plurality of insulated wires of a flat ribbon cable, the method comprising:

connecting, via a cable interface, a lighting-element socket to the flat ribbon cable;

piercing, via a plurality of piercing members, insulation of corresponding ones of the plurality of insulated wires when the cable interface connects the lighting-element socket to the flat ribbon cable, the plurality of piercing members including a plurality of peripheral ones located at a common radial distance about a central one;

providing, via each of the plurality of piercing members, a conductive connection point to the corresponding one of the plurality of insulated wires;

receiving, via a lighting-element socket coupled to the cable interface, a lighting element within;

conductively connecting, via the lighting-element socket, a central electrical contact at a base of the lighting element received and the central one of the plurality of piercing members;

conductively connecting, via the lighting-element socket, a peripheral electrical contact about the base of the lighting element received and an inner conductive peripheral wall of the lighting-element socket; and rotatably selecting and conductively connecting, via a rotatable power-channel selector conductively connected to the inner conductive peripheral wall of the lighting-element socket, to a selected one of the peripheral ones of the plurality of piecing members.

17. The method of claim 16, wherein connecting a lighting-element socket to the flat ribbon cable comprises:

opening a top member and a bottom member of the cable interface;

aligning the flat ribbon cable with at least one of the top member or bottom member of the cable interface; and closing the top member and bottom member of the cable interface about the flat ribbon cable.

* * * * *